Patented Aug. 13, 1946

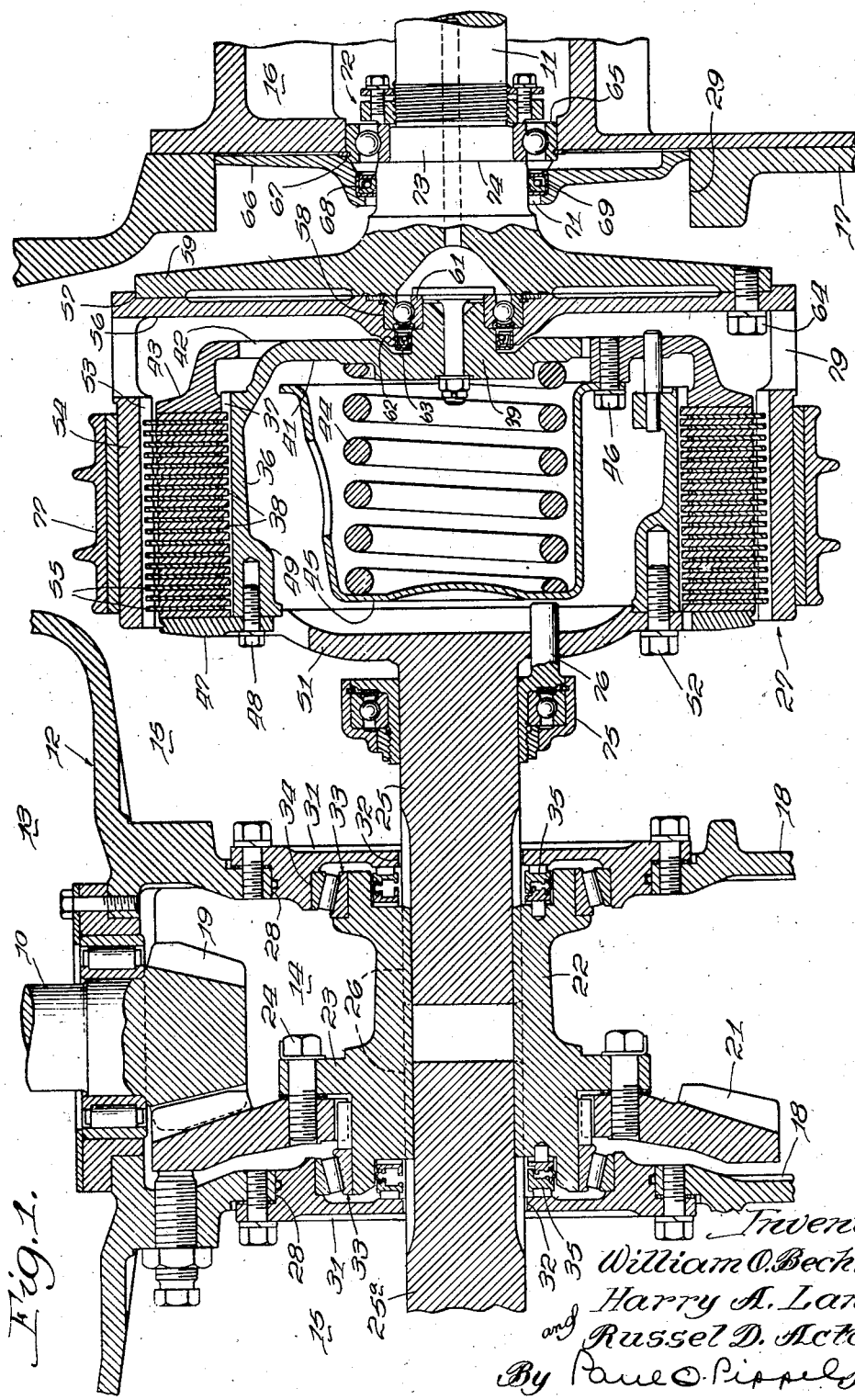

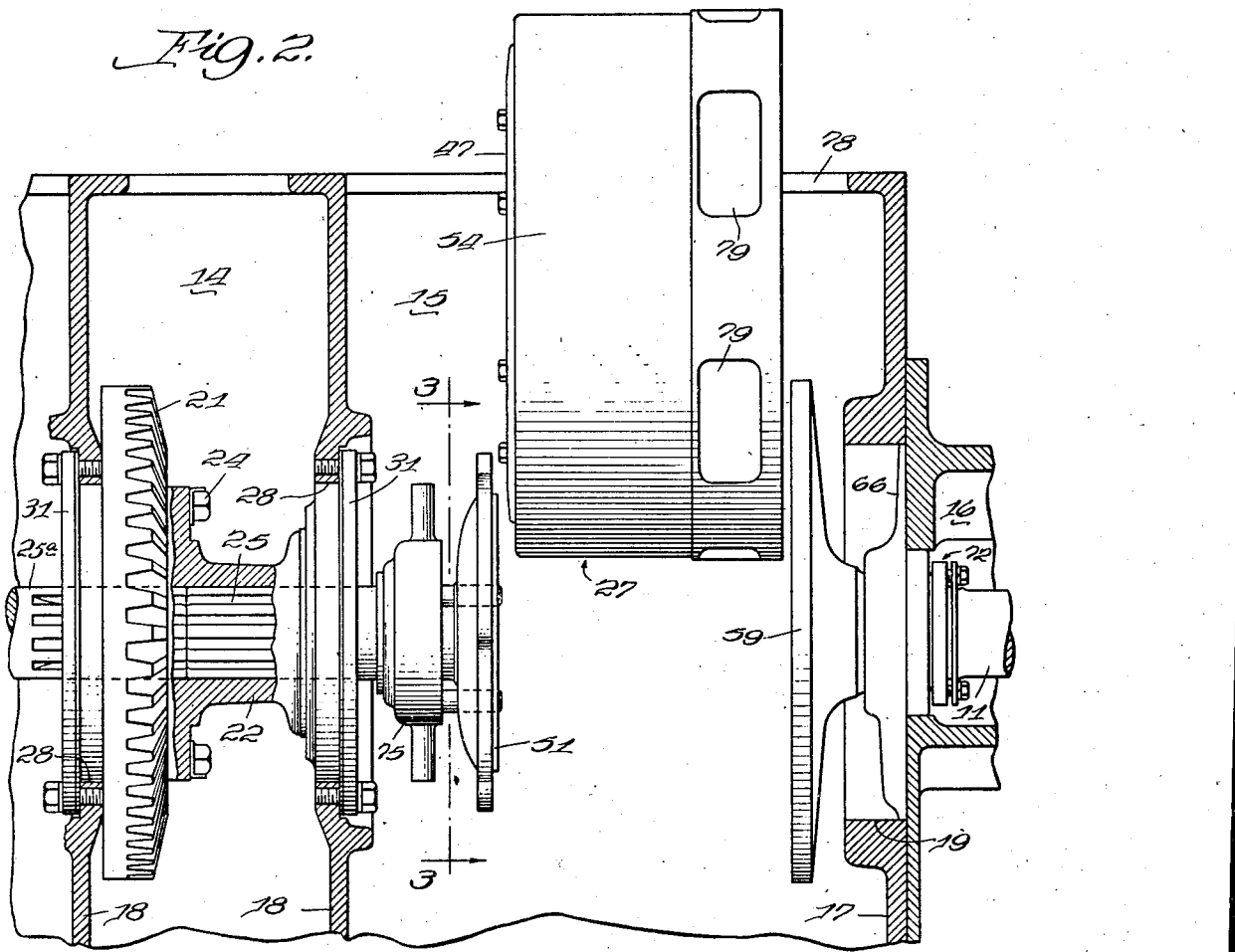

2,405,549

UNITED STATES PATENT OFFICE 2,405,549

FINAL DRIVE STRUCTURE FOR CRAWLER TRACTORS

William O. Bechman, Harry A. Land, and Russel D. Acton, Chicago, Ill., assignors to International Harvester Company, a corporation of New Jersey Application June 26, 1944, Serial No. 542,142

3 Claims. (Cl. 74—606)

This invention has to do with a drive structure for a crawler tractor and more particularly relates to a multi-compartment frame housing of the tractor together with journaled supporting means therein for a steering clutch, and drive and driven members for the clutch which are detachably associated therewith in such a manner that the clutch can be relatively easily installed and removed in a clutch receiving compartment of the frame housing without the necessity of removing or detaching unassociated parts.

Attention is invited to U. S. Patent No. 2,197,289 to D. B. Baker et al., which shows a track drive for a crawler tractor wherein the design is such that the steering clutches can be removed from their housing compartments in a manner minimizing the number of operations and time with respect to what had been required theretofore, but the present invention makes it possible to further diminish the time and effort required in the removal, repair, and reinstallation of a clutch. Attention is also directed to copending applications Serial Nos. 542,143, 542,144, and 542,145, all filed June 26, 1944, assigned to the assignee of the present application and claiming subject matter herein shown but not claimed.

In conventional track-laying tractors, steering is accomplished by the interruption of the driving force to one of the vehicle tracks. Interruption of the driving force is brought about selectively to either of the tracks by the opening of a steering (and power transmitting) clutch which is interposed in the power delivery train leading respectively thereto. In larger tractors the steering clutches are the multiple disk type and are both large and heavy, requiring a hoist for their support during an installation or removal operation. Moreover, the severe service to which the tractors are subjected makes it necessary for the frequent service of the clutches. It is desirable, therefore, to provide a clutch installation which will minimize the task of removing and reassembling the clutches and this invention accomplishes such object by so constructing the power transmitting elements and the parts of the tractor collateral thereto that these collateral parts need no be disturbed when the clutch is withdrawn or installed.

Another object is the provision in a frame housing for a crawler tractor of a lubricant-free clutch compartment between lubricant-containing compartments, and power transmitting shafting extending from a clutch in the clutch compartment into the lubricant-containing compartments in conjunction with sealing means which provides for the manipulation of such shafting, pursuant to removal of the clutch, without attendant leakage of lubricant into the clutch compartment.

A further object is the provision of a driving assembly according to the preceding object, wherein one of the shafts is axially movable from the clutch after its disconnection therefrom to provide necessary clearance for removal of the clutch.

Still a further object is the provision of a novel tubular driving member journaled upon opposite walls of one of the lubricant-containing compartments, sealing means cooperable with said tubular member for preventing accidental leakage of the lubricant through shaft openings in each of said walls, and wherein the driving shafts for clutches upon either side of said compartment project through said openings into axially adjustable driving relation with the tubular member to facilitate axial movement of each of said shafts away from its respective clutch after detachment therefrom, to provide the aforesaid clearance which facilitates the clutch removal.

These and other desirable objects inherent in and encompassed by the invention will be better understood after reading the following description with reference to the accompanying two sheets of drawings, wherein:

Fig. 1 is a horizontal sectional view taken through the rear portion of the body or frame housing of a crawler tractor, showing a center gear compartment, a clutch compartment, and a portion of a final drive compartment;

Fig. 2 is a vertical sectional view of the apparatus shown in Fig. 1, but with the clutch viewed in elevation and illustrated in a partly removed position; and Fig. 3 is a sectional view taken on the line 3—3 of Fig. 2.

With continued reference to the drawings, the rear body of the tractor, which may be considered as the tractor frame and also as a housing for the power transmission mechanism, is shown only sufficiently to disclose the relation of such mechanism to a power input shaft 10 and a power output shaft 11. The frame housing 12 includes a change speed transmission gear compartment 13, wherein gearing (not shown) determines the speed and direction that the input shaft 10 is driven with respect to the vehicle engine. There is also provided in the frame housing 12 a gear compartment 14, clutch compartments 15 on opposite sides of said gear compartment and final drive compartments 16 (only one being shown) outwardly of the clutch compartments 15. A tail wall 17 separates each of the compartments 15 from its associated final drive housing 16, and a head wall 18 separates the gear compartment 14 from each of the clutch compartments 15.

Power from the input shaft 19 is transmitted through a pinion gear 19 formed integrally therewith to a bevel gear 21 and thence to a tubular driving member 22, having a flange 23 to which the gear 21 is secured by bolts 24. At the driving member 22, the power may be divided and transmitted in opposite directions through shafts 25 and 25ª, each of which is splined internally to the tubular driving member 22 as indicated at 26. From the shaft 25, the power is transmitted through a steering clutch 27 to the output shaft 11 when said clutch is closed. Additional gearing (not shown) in the lubricant-containing compartment 16 is utilized for further speed reduction before the power is applied to a driving sprocket for the endless track of the tractor. A similar arrangement (not shown) is employed between the shaft 25ª and an endless track at the opposite side of the tractor.

Each of the compartment separating walls 18 contains a large opening 28 which is accurately centered with openings 29 in the walls 17 of which but one is shown. Openings 28 carry and center bearing supporting plates 31. Each plate 31, secured to its wall 18 by cap-screws 30, contains an opening 32 for accommodating and which is slightly oversize with respect to the shaft 25 or 25ª. Roller bearing units 33 are carried upon shoulders 34 in the plates 31 for rotatably supporting the tubular driving member 22 coaxially with the openings 28 in the compartment separating walls. The bearing units 33 are lubricated by lubricant contained within the gear compartment 14 and some of this lubricant passes between the rollers of such units, but is prevented from leaking into the clutch compartments 15 by annular oil seal devices 35 of any conventional structure. These oil seal devices 35, therefore, cooperate with the tubular driving member 22 in preventing the leakage of the lubricant from the gear compartment 14 outwardly of this compartment through the wall plate openings 32.

The clutch 27, which may be removed from the housing 15 as a unit is thoroughly described in the aforesaid application, Serial No. 542,143, so that a brief description thereof here will suffice. The driving part of said clutch includes an inner drum 36 on which there are formed exterior axially extending ribs 37 which fit into notches (not shown) within the inner peripheries of a series of friction drive disks 38. A hub 39 for the drum 36 is connected therewith by spoke-like radiating portions 41, the space between the radiating portions 41 accommodating radiating portions 42 of a pressure plate 43. A coiled spring 44 which tends to maintain the clutch engaged reacts between a portion of the hub 39 and the left end of a spring cup 45 of which the base is connected to the pressure plate 43 by cap-screws 46. A reaction plate 47 at the left end of the friction rings is secured to the left end of the driving drum 36 by a plurality of circumferentially spaced cap-screws 48 which are anchored in radially inwardly projecting bosses 49 on said drum 36. Alternate of the circumferentially spaced bosses 49 are secured to an enlarged flanged end 51 of the shaft 25 by cap-screws 52. This is clearly illustrated in Fig. 3.

Axial circumferentially spaced ribs 53, on an outer drum 54 of the clutch, are received in notches (not shown) in the outer periphery of friction driven disk rings 55. The driven drum 54 has an end wall 56 at its outer or right end which contains coaxial seats 57 and 58 respectively for the outer periphery of flange 59 on the clutch-driven shaft 11 and for a ball bearing unit 61 which pilots the hub 39 of the clutch driving member in said end wall 56. An opening 62 coaxial with the shoulder 58 is sufficiently larger than the portion of the hub 39 therein to accommodate an oil seal member 63 between these parts. Attachment of the driven drum end wall 56 to the clutch-driven shaft 11 is accomplished by means of cap-screws 64 distributed circumferentially about the end wall and turned into suitable holes near the edge of the flange 59.

A ball bearing unit 65 for journaling the driven shaft 11 has its outer race centered with respect to the compartment wall opening 29 by a centering plate 66 fitted into such opening and having a shoulder 67 for said bearing unit. A second shoulder 68 in the centering plate receives an oil seal device 69 which acts with the driven shaft in preventing leakage of lubricant from the final drive compartment 16 into the lubricant-free compartment 15, through the oversize shaft receiving opening 71 in said centering plate. A standard means 72 is employed for holding the inner race of the ball bearing unit 65 upon a shaft section 73 and against a shaft shoulder 74.

Normally, as explained hereinabove, the large coiled spring 44 in the clutch maintains the clutch engaged while acting against the hub of the driving drum 36 and pressing the spring cup 45 to the left together with the pressure plate 43, whereby the alternately arranged driving and driven friction rings 38 and 55 are pressed together in stacked relation against a reaction plate 47 secured to the left end of the driving drum. Thus rotative force from the clutch driving shaft 25 is transmitted from the driving drum 36 through the plates 38 and 55 to the driven drum 54 and thence through the driven shaft flange 59 to said driven shaft. Release of the clutch is effected by manual movement of a throwout bearing unit 75, to the left of the clutch, to the right whereby stems 76 are pressed against the spring retaining cup 45 to force it, and the pressure plate 43 to the right incident to compressing the spring.

In braking the vehicle, brake bands 77 of any conventional structure may be applied to the outer periphery of the clutch driven drums 54, and also the brake bands may be applied to the clutch drums 54 selectively to obtain or facilitate steering of the vehicle in the conventional manner.

When it is desired to remove one of the clutches 27 to service the same as by the replacement of the friction rings 38 and 55, the mechanic will gain access to the heads of the cap-screws 52 and 64 through a casing opening 78 of Fig. 2 and unscrew these cap-screws respectively from the left end of the clutch driving drum 36 and from the plate 59 on the left end of the clutch driven shaft 11. Openings 79 (Figs. 1 and 2) are provided in the clutch driven drum 54 in radial registry with the cap-screws 64 so that the heads of the cap-screws are accessible to a wrench. Subsequent to the removal of the cap-screws 52 and 64, and the attachment of a hoist to the clutch 27, the shaft 25 will be forced to the left, as viewed in Fig. 2, into abutment with the right end of the shaft 25ª so as to provide clearance between the driving and driven shaft flanges or plates 51 and 59, as illustrated in Fig. 2, so that the clutch can be lifted bodily and unitarily from its compartment 15. During these manipulations of the clutch 27, the oil seal device 69 will prevent the leakage of lubricant from the final drive compartment 16 into the lubricant-free clutch compartment 15 and the sealing devices 35 at opposite ends of the tubular driving member 22 together with such tubular member will prevent leakage of lubricant from the gear compartment 14 into the clutch compartments. A similar procedure is followed for removing the clutch 27 (not shown) in the left clutch compartment 15, but, of course, in that procedure the shaft 25a will be moved to the right to abut within the shaft 25 for providing the necessary clearance which facilitates removal of the clutch.

Having thus described a preferred embodiment of the invention with the view of clearly illustrating the same, I claim:

1. In a vehicle power transmitting apparatus employing a lubricant-free clutch for transmitting power from a lubricated gearing; the combination of a vehicle frame housing comprising a lubricant-containing compartment for said gearing and an adjacent lubricant-dry clutch compartment for said clutch, said gear compartment including opposite walls of which one separates said compartments and contains a drive shaft opening, a tubular driving member journaled in the gear compartment in axial registration with said wall opening and rotatively drivable by said gearing, a clutch driving shaft having a portion telescopically in said tubular member and constrained for rotation therewith, said shaft having a second portion projecting endwise from the tubular member and through said wall opening into detachable driving connection with said clutch to facilitate endwise retraction of the detached shaft from the clutch pursuant to projection of the one portion of the shaft further into said tubular member and thereby providing clearance for removal of the clutch from the clutch compartment transversely of said shaft, and sealing means between the tubular driving member and each of said walls to cooperate with said driving member in preventing leakage of lubricant from the gear compartment through said wall opening into the clutch compartment.

2. In a vehicle power transmitting apparatus employing a lubricant-free clutch for transmitting power from a lubricated gearing; the combination of a vehicle frame housing comprising a lubricant-containing compartment for said gearing and an adjacent lubricant-dry clutch compartment for said clutch, said gear compartment including opposite walls of which one separates said compartments and contains a drive shaft opening, coaxially arranged bearings respectively on said compartment walls in axial registry with said wall opening, an internally splined open-ended tubular member extending across the lubricant-containing compartment in journaled relation with said bearings and driven from said gearing, a clutch driving shaft detachably drivingly connected with said clutch and having a splined portion extending endwise from the clutch into telescopic meshed relation with the internally splined tubular member and through said wall opening, the telescopic relation of said shaft and tubular member facilitating endwise movement of the shaft from the clutch when detached therefrom to provide clearance for removal of the clutch from its compartment transversely of said shaft, and sealing means between the tubular driving member and each of said walls to cooperate with said driving member in preventing leakage of lubricant from the gear compartment through said wall opening into the clutch compartment.

3. In a vehicle power transmitting apparatus employing lubricant-free clutches for transmitting power from a lubricated gearing; the combination of a vehicle frame housing comprising a lubricant-containing gear compartment for said gearing, lubricant-free clutch compartments on opposite sides of said gear compartment and opposite gear compartment walls separating the gear compartment from said clutch compartments, said walls containing respective coaxially registering openings communicating with the clutch compartments, coaxial bearings respectively on said walls in axial registry with said openings, an open-ended tubular gear-driven driving member journaled in said bearings, said member extending across the gearing compartment in axial registry with said wall openings and being driven by said gearing, clutch driving shafts having outer end portions respectively detachably connected with said clutches and inner end portions projecting inwardly of said tubular driving member at its ends but spaced axially from one another so either can move endwise when detached from its clutch and thereby provide clearance for removal of its associated clutch transversely thereof, means causing the shafts to rotate with said tubular member while accommodating said endwise movement, and sealing means between said tubular member and each of said walls to cooperate with said member in preventing leakage of lubricant from the gear compartment through said wall openings into the clutch compartments irrespective of clearance between said shafts and said wall openings.

WILLIAM O. BECHMAN.
HARRY A. LAND.
RUSSEL D. ACTON.